(12) United States Patent
Lee

(10) Patent No.: US 7,345,960 B2
(45) Date of Patent: Mar. 18, 2008

(54) METHOD OF TRAY EJECTING FORCE CONTROL

(75) Inventor: Yi-Chung Lee, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 838 days.

(21) Appl. No.: 10/891,359

(22) Filed: Jul. 14, 2004

(65) Prior Publication Data

US 2005/0013210 A1   Jan. 20, 2005

(30) Foreign Application Priority Data

Jul. 16, 2003   (TW) .............................. 92119366 A

(51) Int. Cl.
*G11B 7/085* (2006.01)
(52) U.S. Cl. ................. 369/30.27; 369/30.36
(58) Field of Classification Search ............ 369/30.27, 369/30.36, 47.1, 30.18, 30.99, 30.93, 30.98
See application file for complete search history.

(56) References Cited

U.S. PATENT DOCUMENTS

| 2005/0013209 A1* | 1/2005 | Hsu .......................... 369/30.27 |
| 2005/0219968 A1* | 10/2005 | Lin et al. .................. 369/30.27 |
| 2005/0259533 A1* | 11/2005 | Sakagami ................... 369/47.1 |

* cited by examiner

*Primary Examiner*—Ali Neyzari
(74) *Attorney, Agent, or Firm*—Thomas, Kayden, Horstemeyer & Risley

(57) ABSTRACT

A method of tray ejecting force control for a tray-type optical drive is disclosed. A preliminary input voltage is provided to a DC motor of the tray-type optical drive to perform a preliminary ejection of a tray-type optical drive tray during a preliminary time period. When the preliminary time period is shorter than a predetermined time period, a first voltage smaller than the preliminary input voltage is provided to the DC motor to eject the tray. Alternately, when the preliminary time period is longer than the predetermined time period, a second voltage greater than the first voltage is provided to the DC motor for to eject the tray.

5 Claims, 5 Drawing Sheets

METHOD OF TRAY EJECTING FORCE CONTROL

BACKGROUND OF THE INVENTION

1. Field of the Invention

The present invention relates to a method of tray ejecting force control, and in particular to a method of determining the tray ejecting force for a tray-type optical drive.

2. Description of the Related Art

The rapid development of optical media technology has resulted in the use of a variety of different optical drives as computer peripherals. The prevailing design trend is toward optical drives with high retrieval rate.

Optical drives can be categorized as either tray-type or slot-in type according to the way the optical disc is inserted. FIG. 1a shows a conventional tray-type optical drive, which has a tray 10, an optical pickup 20, a turntable 30, and one motor 40 as an actuator. The optical pickup 20, the turntable 30, and the motor 40 are disposed in a frame 50, and the tray 10 is movable and can be inserted into or ejected from the frame 50. Further, a supporting plate 26 is disposed in the frame 50 to hold the optical pickup 20 and the turntable 30.

The motor 40 drives the optical pickup 20, the turntable 30, and a transmission device 52, i.e. a plurality of gears and pulleys, on the frame 50. Generally, there may be more than one motor 40 to drive the optical pickup 20, the turntable 30, and the transmission device 52 respectively. The tray 10 has a disc-receiving recess 12 for holding the optical disc and a rack (not shown) disposed under the tray 10 to engage the transmission device 52. Since the supporting plate 26 holds the optical pickup 20 and the turntable 30, the optical pickup 20 moves across the optical disc and the turntable 30 is inserted into the center hole of the optical disc to rotate the optical disc.

Further, a position detecting device, which includes an inner limit switch 54 and an outer limit switch 56 in FIG. 1a, is provided on the frame 50 for detecting and controlling the position of the tray 10 in relation to the frame 50.

Moreover, a clamping device, i.e. a clamper, is generally applied in the optical drive to secure the optical disc on the turntable 30 during rotation. FIG. 1b shows an example of the clamper in a conventional optical drive, in which the clamper 60 is disposed in a rocker shaft to rotate by the pivot 62. When an optical disc 1 is disposed in the optical drive and the turntable 30 is inserted into the center hole of the optical disc 1, the clamper 60 clamps the optical disc 1 on the turntable 30. Thus, the optical disc 1 held between the turntable 30 and the clamper 60 can rotate stably. The clamper 60 can be elastic, magnetic or another type of clamper.

When an optical disc 1 is to be loaded in the optical drive, the tray 10 is ejected. Generally, an ejection key on the panel of the optical drive is pressed to eject the tray 10 from the optical drive. The optical disc 1 is then placed in the disc-receiving recess 12, on the tray 10. The tray 10 is then inserted into the optical drive. The turntable 30 then moves into the center hole of the optical disc 1 and the clamper 60 secures the optical disc 1 on the turntable 30 to rotate the optical disc 1. The optical pickup 20 then moves across the optical disc 1 to perform read and write operations.

Generally, a direct current (DC) motor is employed as the motor 40 to drive and control the sliding of the tray 10 and the clamping operation of the clamper 60. The output torque and the power of the DC motor are variable depending on the input voltage. Thus, ejection or insertion of the tray 10 and the clamping motion of the clamper 60 can be performed simultaneously, and the operation of the optical drive can be effectively enhanced.

The ejection of the tray 10 and the clamping motion of the clamper 60 are described in detail with reference to the flowchart shown in FIG. 1c. When the ejection key on the panel of the optical drive is pressed, an ejection command is sent to the optical drive (step S10), and an input voltage is provided to the DC motor 40 to simultaneously drive the clamper 60 and the transmission device 52 (step S20). Thus, a preliminary ejection stage of the tray 10 is initiated, in which the clamper 60 releases the optical disc 1, and the transmission device 52 provides an ejecting force to the tray 10 over a preliminary time period. When the tray 10 starts moving and activates the inner limit switch 56, the preliminary ejection is completed (step S30), and the optical disc 1 moves off the reading position.

Since the clamper 60 should be disengaged from the optical disc after preliminary ejection, the DC motor 40 stops providing voltage to the clamper 60 and continue driving the transmission device 52 to completely eject the tray 10 (step S40). The outer limit switch 54 (step S50) is activated during ejection of the tray 10, indicating that ejection is complete, thereafter, the DC motor 40 stops powering the transmission device 52 (step S60).

However, the clamping force of the magnetic clamper 60 may be weak or abnormal due to manufacturing flaws or other defects. In this case, reading or writing errors may occur, and the optical disc 1 may be damaged during operation due to inconsistent clamping force.

Moreover, since a certain degree of manufacturing tolerance must exist in the tray 10 and the frame 50, the tray 10 may be loose-fitting or tight-fitting in relation to the frame 50. Specifically, when performing ejection or insertion, a loose-fitting tray requires less torque and power from the DC motor 40, while a tight-fitting tray requires greater torque and power from the DC motor 40. Thus, abnormal tray ejection may occur in a tray-type optical drive with a loose or tight-fitting tray 10 when the input voltage of the DC motor 40 is fixed.

For example, in a tray-type optical drive with a loose-fitting tray 10, the output torque and power provided by the DC motor 40 with fixed input voltage may exceed the required torque and power required to eject the loose-fitting tray 10. In this case, the ejecting force provided to the tray 10 is large, and induces a corresponding reaction force during ejection. Thus, when the optical drive is disposed vertically, the optical disc 1 may slip out of the disc-receiving recess 12 during ejection due to the large reaction force, thus increasing the possibility of damage to or breakage of the optical disc 1.

Conversely, in a tray-type optical drive with a tight-fitting tray 10, the output torque and power of the DC motor 40 with fixed input voltage may not be sufficient to simultaneously drive the clamper 60 and the transmission device 52 during preliminary ejection. Thus, the preliminary ejection period is stalled, and it is possible that the clamper 60 will not be fully-separated from the optical disc 1 when the tray 10 begins moving and activates the inner limit switch 56, thus increasing the possibility of a tray jam during ejection.

SUMMARY OF THE INVENTION

Accordingly, an object of the present invention is to provide a method of tray ejecting force control for a tray-type optical drive, in which fitting of the tray is estimated by measuring the preliminary time period of the preliminary ejection. Thus, the input voltage of the DC motor can be adjusted according to the provided fitting estimation in order to prevent abnormal tray ejection.

To achieve the foregoing and other objects, the present invention is directed to a method of tray ejecting force control for a tray-type optical drive. A preliminary input voltage is provided to a DC motor of the tray-type optical drive for performing preliminary ejection of a tray-type optical drive tray over a preliminary time period. When the preliminary time period is shorter than a predetermined time period, the first voltage provided is less than the preliminary input voltage provided to the DC motor to eject the stray. Alternately, when the preliminary time period is longer than the predetermined time period, a second voltage greater than the first voltage is provided to the DC to eject the tray.

In a preferred embodiment of the present invention, the preliminary input voltage is provided to the DC motor when an ejection command is sent to the tray-type optical drive, e.g. by pressing on an ejection key on a panel of the tray-type optical drive. Further, the preliminary ejection includes a releasing process of a clamper of the tray-type optical drive and a process of activating an inner limit switch by the tray, and the preliminary input voltage, the first voltage and the second voltage can be determined according to a power/current ratio of the DC motor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

As previously mentioned, it is possible that abnormal tray ejection may occur in a tray-type optical drive with a loose or tight-fitting tray 10 when the input voltage of the DC motor 40 is fixed. Thus, the present invention provides a method of tray ejecting force control for a tray-type optical drive, in which fitting of the tray is estimated according to the preliminary time period of the preliminary ejection.

Thus, the input voltage of the DC motor can be adjusted according to the fitting estimation to prevent abnormal tray ejection.

Figure 1A:
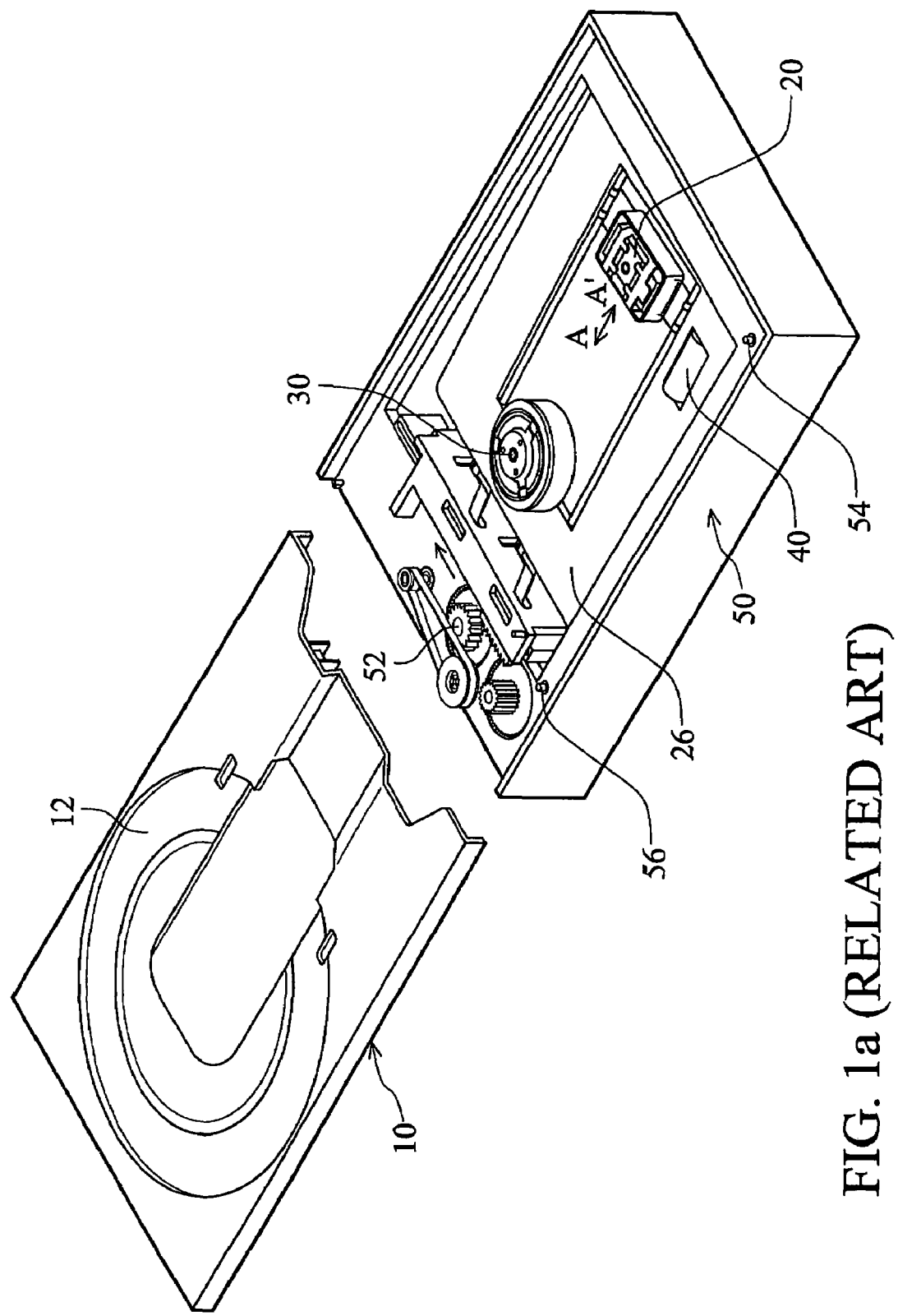
FIG. 1a is a schematic perspective view of a conventional tray-type optical drive.
Figure 1B:
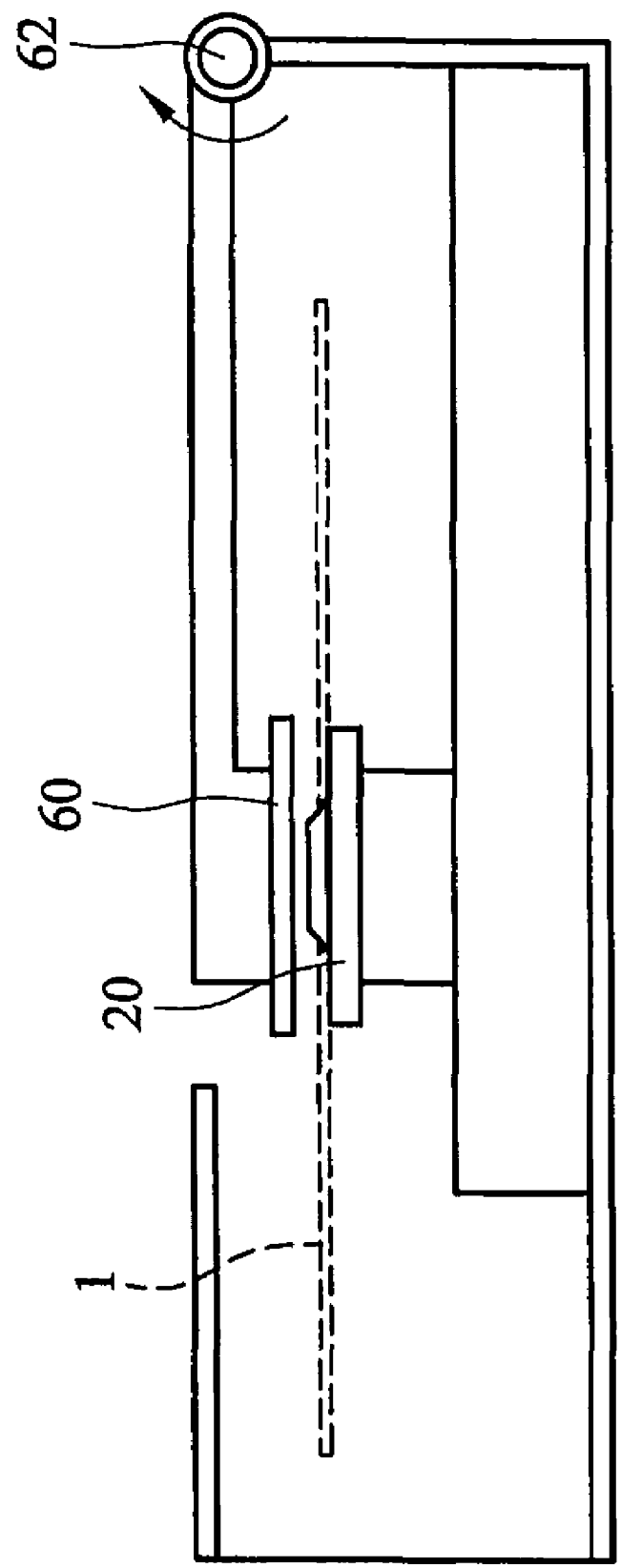
FIG. 1b is a schematic side view of a clamper of the conventional tray-type optical drive.
Figure 2:
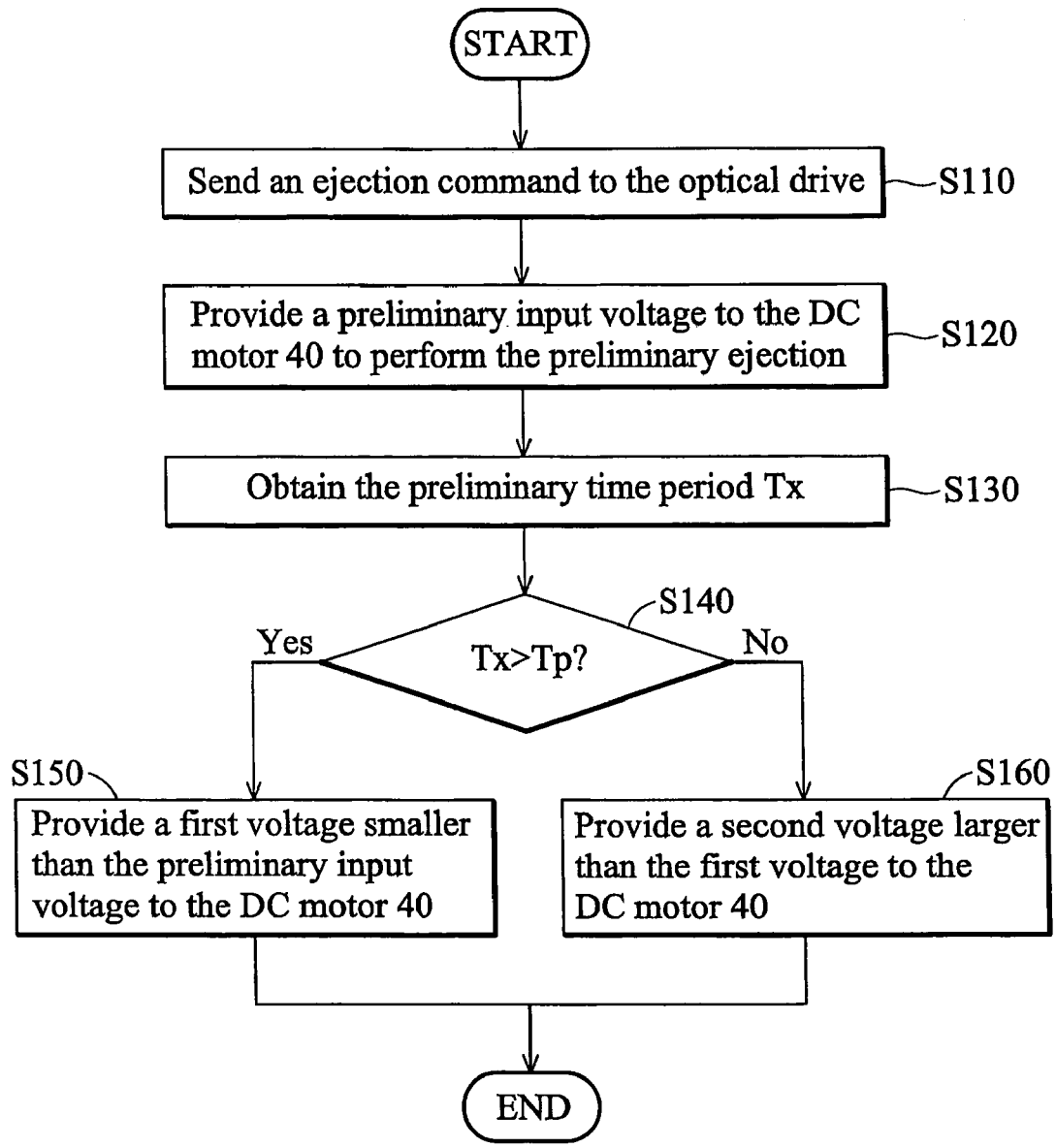
FIG. 2 is a flowchart showing the method of tray ejecting force control of the present invention.

FIG. 2 shows a flowchart of the method of tray ejecting force control of the present invention. The method of the present invention is applicable to a tray-type optical drive, e.g. the conventional tray-type optical drive as shown in FIG. 1a and FIG. 1b.

Figure 1C:
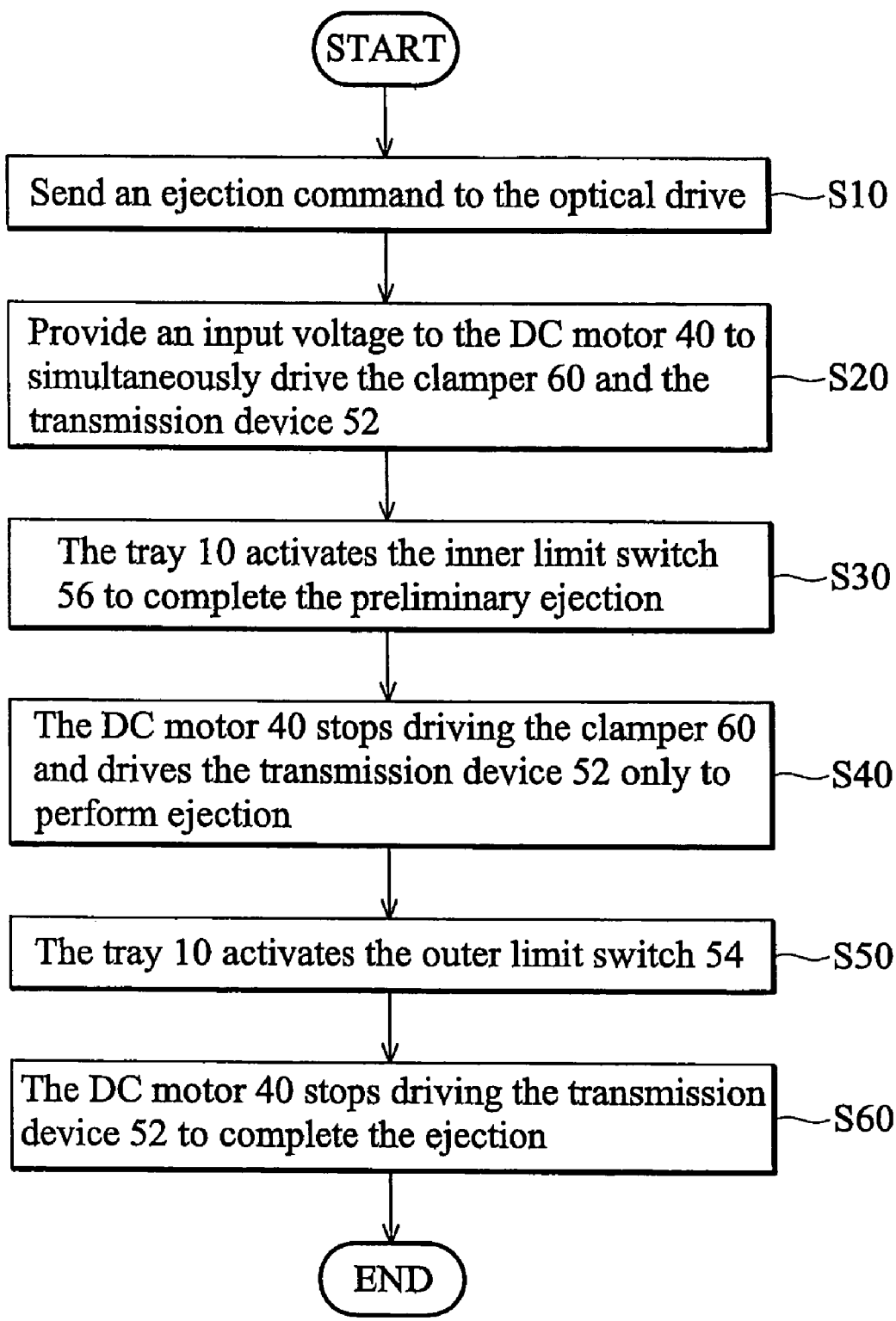
FIG. 1c is a flowchart showing tray ejection of the conventional tray-type optical drive.

When the user presses the ejection key on the panel of the optical drive, an ejection command is sent to the optical drive (step S110), and a preliminary input voltage is provided to the DC motor 40 to simultaneously drive the clamper 60 and the transmission device 52 (step S120). As described in steps S20 and S30 shown in FIG. 1c., preliminary ejection of the tray 10, in which the clamper 60 releases the optical disc 1, and the transmission device 52 provides an ejecting force to the tray 10 during a preliminary time period. When the tray 10 starts moving and activates the inner limit switch 56, the preliminary ejection is completed, the optical disc 1 moves off the reading position, and the preliminary time period Tx is obtained (step S130).

Accordingly, a predetermined time period Tp is provided as a default measurement for fitting the tray 10. The predetermined time period Tp is obtained by performing tray ejection experiments to determine the average preliminary time period. The preliminary time period Tx and the predetermined time period Tp are then compared (step S140) to determine the optimal fitting of the tray 10.

When the tray 10 is a loose-fitting tray, the output torque and power of the DC motor 40 with fixed input voltage may exceed the required torque and power to drive the loose-fitting tray 10. In this case, the ejecting force provided to the tray 10 is large, and the preliminary time period Tx is shorter than the average preliminary time period. That is, the loose-fitting tray 10 activates the inner limit switch 56 in a shorter preliminary time period Tx.

As a result, when the preliminary time period Tx is shorter than the predetermined time period Tp, the tray 10 is determined to be a loose-fitting tray. In this case, a first voltage less than the preliminary input voltage is provided to the DC motor 40 to eject the tray 10 (step S150). The first voltage can be predetermined a less than the preliminary input voltage so that the ejecting force is relatively reduced, thus the reaction to said force is also reduced during ejection. Moreover, even if the optical drive is disposed vertically, the optical disc 1 can be prevented from slipping out of the disc-receiving recess 12 when ejected.

Figure 3A:
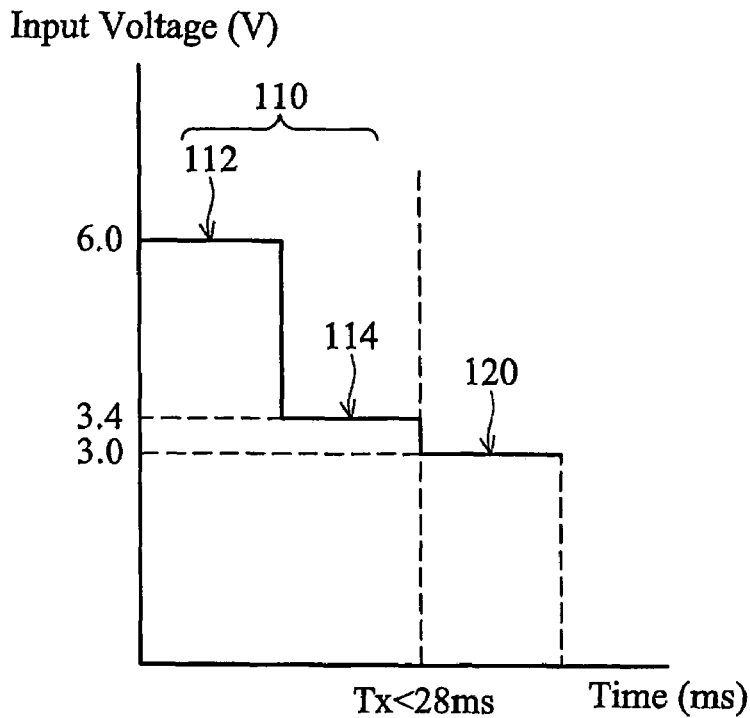
FIG. 3a is a diagram of a first embodiment showing the input voltage of the DC motor of the tray-type optical drive with a loose-fitting tray.

A first embodiment of the tray-type optical drive with a loose-fitting tray is described with reference to FIG. 3a, which shows a diagram of the input voltage of the DC motor. In FIG. 3a, the preliminary input voltage includes a first input voltage 112 of 6 volts and a second input voltage 114 of 3.4 volts, enabling the DC motor 40 to simultaneously drive the clamper 60 and the transmission device 52 smoothly. Further, the predetermined time period Tp shown in FIG. 3a is 28 microseconds, which is obtained as an average preliminary time period from tray ejection experiments. Since the preliminary time period Tx is shorter than 28 microseconds in FIG. 3a, the tray 10 is determined to be loose-fitting, and a DC voltage of 3 volts, which is smaller than the preliminary input voltage provided to the DC motor 40 as the first voltage to eject the tray 10, as described in step S150.

On the other hand, when the tray 10 is a tight-fitting tray, the output torque and power of the DC motor 40 with fixed input voltage may not be sufficient to simultaneously drive the clamper 60 and the transmission device 52 during preliminary ejection. In this case, the ejecting force provided on the tray 10 is small, and the preliminary time period Tx is longer than the average preliminary time period, That is, the tight-fitting tray 10 requires a longer preliminary time period to activate the inner limit switch 56.

As a result, when the preliminary time period Tx is longer than the predetermined time period Tp, the tray 10 is determined to be a tight-fitting tray. In this case, a second voltage greater than the first voltage is provided to the DC motor 40 to eject the tray 10 (step S160). The second voltage can be predetermined to greater than the first voltage so that the ejecting force provided is relatively increased. Thus, even if the preliminary time period is stalled, or the clamper 60 is not fully-separated from the optical disc 1 when the tray 10 activates the inner limit switch 56, the increased ejecting force may be essential to completely release the optical disc 1 from the clamper 60, and to prevent a tray jam during ejection.

Figure 3B:
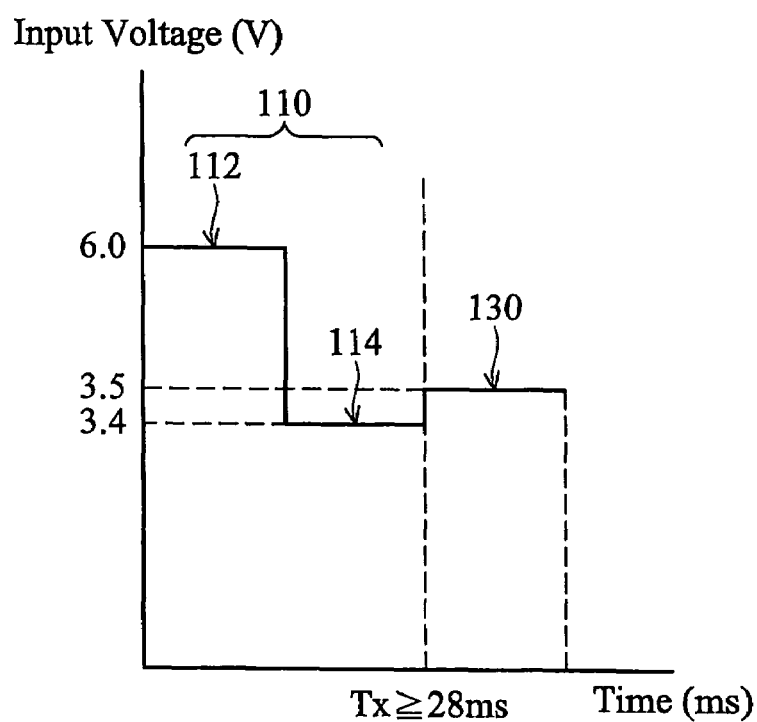
FIG. 3b is a diagram of a second embodiment showing the input voltage of the DC motor of the tray-type optical drive with a tight-fitting tray.

A second embodiment of the tray-type optical drive with a tight-fitting tray is described with reference to FIG. 3b, which shows a diagram of the voltage input to the DC motor. Similarly in FIG. 3a, the preliminary input voltage shown in FIG. 3b includes a first input voltage 112 of 6 volts and a second input voltage 114 of 3.4 volts, and the predetermined time period Tp in FIG. 3b is 28 microseconds. Since the preliminary time period TX is longer than the 28 microseconds shown in FIG. 3b, the tray 10 is determined to be tight-fitting, and a DC voltage of 3.5 volts, which is larger than the first voltage of 3 volts, is provided to the DC motor 40 as the second voltage to eject the tray 10, as described in step S160.

It should be noted that, the preliminary input voltage, the first voltage, and the second voltage can be determined in accordance with the characteristics of the DC motor 40. For example, in the aforementioned embodiments, the preliminary input voltage, the first voltage and the second voltage are determined by experiments according to the power/current ratio of the DC motor 40. Further, the predetermined time period Tp can be obtained from experiments as an average preliminary time period. Accordingly, when a DC motor 40 with significantly different characteristics is employed in the tray-type optical drive, a plurality of tray ejection experiments should be performed for adjustment of the preliminary input voltage, the first voltage, the second voltage, or the predetermined time period Tp. Thus, the method of the present invention can be performed to reliably prevent abnormal tray ejection.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of tray ejecting force control for a tray-type optical drive, comprising:

providing a preliminary input voltage to a DC motor of the tray-type optical drive to perform a preliminary ejection of the tray-type optical drive tray during a preliminary time period;

providing a first voltage smaller than the preliminary input voltage to the DC motor to eject the tray when the preliminary time period is shorter than a predetermined time period; and providing a second voltage larger than the first voltage to the DC motor to eject the tray when the preliminary time period is longer than the predetermined time period.

2. The method of tray ejecting force control as claimed in claim 1, wherein the preliminary input voltage is provided to the DC motor when an ejection command is sent to the tray-type optical drive.

3. The method of tray ejecting force control as claimed in claim 2, wherein the ejection command is sent to the tray-type optical drive by pressing on an ejection key of a panel of the tray-type optical drive.

4. The method of tray ejecting force control as claimed in claim 1, wherein the preliminary ejection comprises a process of releasing a clamper of the tray-type optical drive and a process of activating an inner limit switch by the tray.

5. The method of tray ejecting force control as claimed in claim 1, wherein the preliminary input voltage, the first voltage and the second voltage are determined according to a power/current ratio of the DC motor.

* * * * *